United States Patent

Aagaard

[15] 3,671,946

[45] June 20, 1972

[54] BINARY STORAGE CIRCUIT ARRANGEMENT

[72] Inventor: Einar Andreas Aagaard, Emmasingel, Eindhoven, Netherlands

[73] Assignee: U.S. Philips Corporation, New York, N.Y.

[22] Filed: May 4, 1970

[21] Appl. No.: 34,165

[30] Foreign Application Priority Data

May 29, 1969 Netherlands..........................6908154

[52] U.S. Cl...........................................340/173 FF, 307/291

[51] Int. Cl.....................................G11c 11/40, H03k 3/286

[58] Field of Search..............................340/173 FF; 307/291

[56] References Cited

UNITED STATES PATENTS 3,292,008 12/1966 Rapp ....................................340/173

3,309,534 3/1967 Yu ........................................340/173

*Primary Examiner*—Terrell W. Fears

*Attorney*—Frank R. Trifari

[57] ABSTRACT

The invention relates to a bistable trigger circuit comprising two transistors and associated with a group of trigger circuits which may be not only in two binary information states in which one transistor is conducting and the other is cut off, but also in a rest position of low dissipation or in a state of higher dissipation for writing or reading information.

According to the invention the trigger circuits can be passed individually into the state of higher dissipation by means of two further transistors, the emitters of which are connected to a control-point individually associated with the triggers and the collectors of which are connected to the respective collectors of the two first transistors, in which write signals are applied to the bases of the further transistors.

8 Claims, 1 Drawing Figure

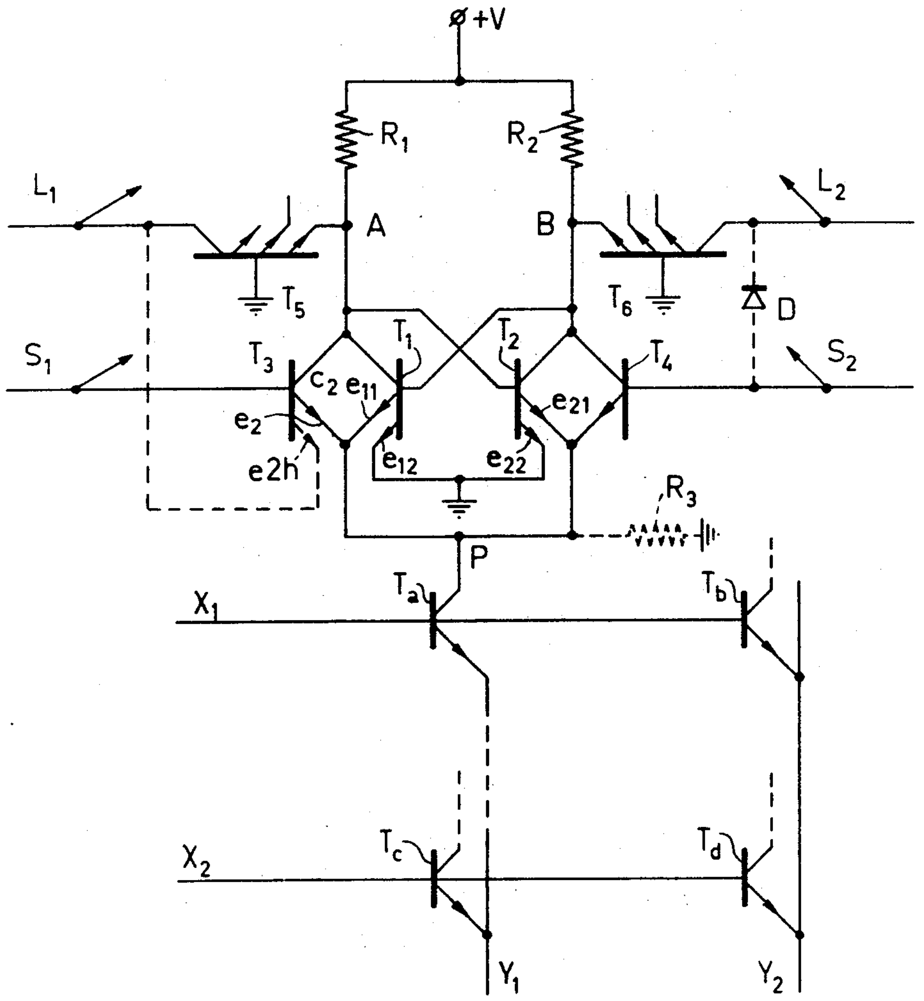
INVENTOR.
EINAR A. AAGAARD
BY
Frank R. Trifari
AGENT

BINARY STORAGE CIRCUIT ARRANGEMENT

This invention relates to a binary storage circuit arrangement comprising a group of trigger circuits each having a first and a second transistor whose base electrodes are connected to the collectors of the other transistors so that the trigger circuits may be in two different information states in which one of the transistors is conducting and the other is cut off or conversely.

Particularly if such a storage circuit is constructed in the form of an integrated circuit, the heat dissipation should be as low as possible.

A storage circuit of this kind is already known and it comprises means for varying the supply voltages of the transistors so that the trigger circuits may be in a steady state of low dissipation or in an operational state of high dissipation. In this case the supply voltages of the collectors of all triggers circuits are simultaneously changed so that the triggers are simultaneously in the state of low or high dissipation. In the known arrangement the triggers are provided with individual write and read conductors, which is particularly undesirable in integrated circuits.

The invention provides an efficient solution in which one of the triggers of a group is selected and is brought into a state of higher dissipation, said trigger coupling itself with control-conductors common to the group and, as the case may be, with one or two common read conductors owing to the resultant voltage variations. A non-selected trigger is not charged so that the tolerances are favorable and the supply current and supply voltage and hence also the dissipation may be very low, while the stability is maintained. In spite thereof the switching rate is high.

The invention is characterized in that the collectors of the first and second transistors of each trigger are connected to the collectors of a third and fourth respectively and the base electrodes of the third and fourth transistors are connected to a first write conductor and a second write conductor respectively common to the group of triggers and the emitters of said four transistors of each trigger are connected to each other and to an identifying point individually associated with the trigger concerned, the potential of said point normally having such a steady value that the trigger is in a steady state of low dissipation, in which the first or the second transistor is slightly conducting and the other transistors are cut off, there being provided means for varying the potential of the identifying point of one of the triggers of the group so that the trigger is in a state of higher dissipation and a write pulse across the first or the second write conductor renders the third or the fourth transistor of the trigger conducting for driving the trigger into a given, desired information state.

The invention will be described more fully with reference to one embodiment shown schematically in the drawing.

The FIGURE shows one trigger circuit of a group of identically designed trigger circuits and a number of common components. The FIGURE shows furthermore in broken lines a few variants.

Essentially the trigger comprises the transistors $T_1$ and $T_2$. The collectors thereof are connected through resistors $R_1$ and $R_2$ to a supply point +V, the voltage of which may be equal to +1 V to ground. The collectors are furthermore connected crosswise to the base electrode of the other transistor.

In the embodiment shown the transistors are each equipped with two emitters $e_{11}$, $e_{12}$ and $e_{21}$, $e_{22}$ respectively. The emitters $e_{12}$ and $e_{22}$ are connected to ground. The emitters $e_{11}$ and $e_{21}$ are connected to an individual identifying point P of the trigger and are furthermore connected to the emitters of the transistors $T_3$ and $T_4$, which perform a gate function, as will be apparent below. The collectors of the transistors $T_3$ and $T_4$ are connected to the collectors of the transistors $T_1$ and $T_2$ and the base electrode of $T_3$ and $T_4$ are connected to the write conductors $S_1$ and $S_2$, common to the whole group of triggers.

The collectors of the transistors are connected at the points A and B to the emitters of the multi-emitter transistors $T_5$ and $T_6$, which serve as read gates and perform an or-function, as will be apparent hereinafter. The other emitters of the transistors $T_5$ and $T_6$ are connected in a corresponding manner to the points A and B of other triggers of the group. The base electrodes are grounded and the collectors are connected to read conductors $L_1$ and $L_2$, which are common to the whole group.

The various triggers of the group are controlled by means of a selection circuit comprising the transistors $T_a$, $T_b$, $T_c$, and so on, which are arranged in known manner in rows and columns of a matrix. The base electrodes of the transistors of one row are connected to one and the same control-conductor $X_1$ or $X_2$ respectively, whereas the emitters of the transistors of the same column are likewise connected to one and the same control-conductor $Y_1$ or $Y_2$ respectively. The collectors of the transistors are connected to the individual identifying points of the various triggers of the group.

In the rest position of the arrangement one of the transistors $T_1$ or $T_2$ of each trigger is always slightly conducting, whereas all further transistors are cut off. If, for example, the transistor $T_1$ of the trigger shown is conducting, a comparatively weak current of, for example, 1 mA flows from the supply point +V via resistor $R_1$ and emitter $e_{12}$ of transistor $T_1$ to ground. The dissipation in the trigger is then of the order of 1mW and hence very low. The emitter $e_{11}$ of transistor $T_1$ is then idle because the transistor $T_a$ is cut off. More particularly, the voltage at point B is then equal to $+V_j$ and the voltage at point A equal to $+V_k$, wherein $V_j$ and $V_k$ are the "junction" voltages between the base and the emitter or between the collector and the emitter respectively of an over-excited transistor. With silicon transistors these voltages $V_j$ and $V_k$ may be equal to about 0.7 V and lie between 0 and 0.4 V respectively. Consequently the voltage at point B is higher than that at point A, the latter being lower than the junction voltage $V_j$ so that transistor $T_2$ is cut off. Since the voltages at points A and B are higher than ground potential, the transistors $T_5$ and $T_6$ are cut off. Also the transistors $T_3$ and $T_4$ are cut off because no current passes through transistor $T_a$.

If information has to be read from the trigger circuit or new information has to be written, the trigger is individually indicated by means of the selection circuit. To this end a positive pulse is applied via known means (not shown) to the control-conductor $X_1$ and the conductor $Y_1$ is, in addition, connected to an appropriate supply source, particularly a current source, as a result of which the transistor $T_a$ becomes conducting and a higher current starts to flow across the resistor $R_1$, the collector and the emitter $e_{11}$ of the transistor $T_1$, the identifying point P and the transistor $T_a$. Thus the voltage at point P drops below ground potential so that the emitter $e_{12}$ becomes idle. Owing to the high voltage drop across resistor $R_1$ the voltage at point A drops below ground potential to an extent such that the transistor $T_5$ becomes conducting via its emitter connected to point A and a read signal characteristic of the information state of the selected trigger appears across the read conductor $L_1$, connected to the collector. It should be noted that if the transistor $T_2$ instead of transistor $T_1$ had been conducting a read signal would be applied in the same manner to the read conductor $L_2$.

When transistor $T_5$ is conducting, as supposed above, the voltage at point A is equal to $-V_j$ i.e., the junction voltage between emitter and base) and is thus held at a fixed value. The voltage at point P is then equal to $-V_j - V_k$ i.e., the voltage $-V_j$ of point A minus the voltage $V_k$ between collector and emitter of transistor $T_1$). The voltage at point B is then equal to $-V_k$, i.e., equal to the voltage $-V_j$ minus $V_k$ of point P plus the junction voltage $V_j$. The voltage at point B is lower than ground potential, it is true, but the transistor $T_6$ remains cut off because the voltage $V_k$ is lower than the junction voltage $V_j$.

The transistor $T_2$ also remains cut off because the voltage difference between the base and the emitter $e_{21}$ is equal to the voltage difference between points A and P and hence equal to $V_k$, i.e. lower than the junction voltage $V_j$.

The transistors $T_3$ and $T_4$ are cut off because the voltage of the write conductors $S_1$ and $S_2$ is normally low, for example, equal to $-2V_j$.

If new information has to be written in the selected trigger, the voltage of the write conductor $S_1$ or $S_2$ is increased according as the transistor $T_1$ or the transistor $T_2$ has to be conducting, for example, to ground potential. It is supposed that a positive pulse is applied to the conductor $S_2$; transistor $T_4$ then becomes conducting so that the voltage at point B drops and transistor $T_1$ is cut off. The voltage at point A thus rises over that at point B so that after cutting off of the transistor $T_4$ at the end of the pulse finally transistor $T_2$ instead of $T_1$ is conducting.

If on the contrary a positive write pulse is applied to the write conductor $S_1$, transistor $T_3$ becomes conducting, but finally transistor $T_1$ remains nevertheless conducting. New information can thus be written on the former without the need for further means.

It should be noted that a positive write pulse at the write conductors $S_1$ or $S_2$ does not affect non-selected triggers, because no current can flow across the identifying points P so that the transistors $T_3$ and $T_4$ remain cut off.

In a variant of the arrangement the emitters $e_{12}$ and $e_{22}$ of the transistors $T_1$ and $T_2$ are lacking and the identifying point P is grounded via the resistor $R_3$, shown in broken lines. The sole difference in operation from the first arrangement resides in that in the rest position the current through the conducting transistor flows to ground via the emitter $e_{11}$ or $e_{21}$ and the resistor $R_3$ instead of flowing through the emitter $e_{12}$ or $e_{22}$. Write pulses of the conductors $S_1$ or $S_2$ cannot affect non-selected triggers because the voltages of the base electrodes of the transistors $T_3$ and $T_4$ cannot exceed those of the emitters. The use of resistors in integrated circuits has some disadvantages so that the arrangement first described, comprising two emitters in each transistor, is to be preferred.

In principle it is not necessary to use two read conductors, a single one will suffice. The appearance or non-appearance of an output signal at a read conductor is in itself an indication of the information state of a selected trigger circuit. For example, the transistor $T_6$ and the read conductor $L_2$ may be omitted. In order to hold also in this case the voltage at point B of a selected trigger at a given value, when transistor $T_2$ is conducting, it is desirable to connect the points B to ground each via a diode. This diode then performs the same function as the emitter-base junction of transistor $T_6$.

Alternatively it is possible to combine pairwise the read and write conductors, for example, the conductors $L_1$ and $S_1$ and the conductors $L_2$ and $S_2$.

In a first variant this may be achieved by omitting the conductor $S_2$ and by coupling the conductor $L_2$ with the base of transistor $T_4$ via a diode D as is indicated in broken lines. In reading this diode has no effect, because it remains cut off. However, if the voltage of the conductor $L_2$ is raised for writing information, the diode becomes conducting when the Zener voltage is exceeded and the voltage at the base of transistor $I_4$ is increased so that the transistor becomes conducting.

It is advantageous to construct the diode as a second emitter of the transistors $T_3$ and $T_4$ as is indicated in broken lines at the transistor $T_3$, which is provided with a second emitter $e_{2A}$. The conductor $S_1$ may then be dispensed with. When a positive pulse appears at conductor $L_1$ and when the Zener voltage is exceeded, the voltage of the base of transistor $T_3$ will increase.

The use of only two conductors, which can serve both in reading and writing, is particularly important in integrated circuits.

What is claimed is:

1. A binary storage element for a group of trigger circuits, each element comprising a first transistor having a base, a collector, and an emitter, a second transistor having a base, a collector, and an emitter, means for cross coupling the bases and collectors of the first and second transistors, whereby the first and second transistors comprise a trigger circuit wherein one of the transistors is conducting and the other is cut off, a third transistor having a base, a collector and an emitter, a fourth transistor having a base, a collector, and an emitter, means for connecting the collector of the first transistor to the collector of the third transistor, means for connecting the collector of the second transistor to the collector of the fourth transistor, means for connecting the base of the third transistor to a first write conductor, means for connecting the base of the fourth transistor to a second write conductor, means for connecting the first and second write conductors to the bases of corresponding third and fourth transistors of other circuit elements in the group of trigger circuits, means for connecting emitters of the four transistors in each element to a common identifying point, the identifying point comprising means for selectively providing a first and a second potential, the first potential having a value sufficient to maintain the trigger in a rest position of low power dissipation wherein alteration of the conductive state of the trigger is prevented, the second potential having a value sufficient to enable the trigger to switch conductive states of the first and second transistors in response to a signal on the first or second write conductor, means for controlling the potential of the first and second potential providing means, the first and second transistors each having a further emitter, and means for connecting the further emitters of the first and second transistors to a common point of constant potential.

2. A storage arrangement as claimed in claim 1 wherein the collector of at least the first transistor of the trigger is connected to a read gate constructed as an or-gate with a plurality of control-inputs connected each to the collectors of the first and third transistors of different trigger circuits, the output of the gate being connected to a read conductor common to the group of triggers so that, if the first transistor is highly conducting the threshold of the gate input concerned is exceeded and a read signal is applied to the read conductor.

3. A storage arrangement as claimed in claim 2 wherein the or-gate is constructed as a multi-emitter transistor, the various emitters of which form the control-inputs, the collector being connected to a read conductor and the base being connected to a point of constant potential.

4. A storage arrangement as claimed in claim 3 wherein also the collectors of the second and fourth transistors of a number of trigger circuits are connected to different emitters of a multi-emitter transistor, the collector of which is connected to a second common read conductor and the base of which is connected to the point of constant potential.

5. A storage arrangement as claimed in claim 3 wherein the collectors of the second and fourth transistors of the trigger circuits are connected via a diode to the point of constant potential.

6. A storage arrangement as claimed in claim 2 wherein the read and write conductors are pairwise combined and the base electrodes of the third and fourth transistors are connected via at least one diode to the read and write conductor concerned.

7. A storage arrangement as claimed in claim 6 wherein the diodes are constructed in the form of second emitters of the third and fourth transistors.

8. A storage arrangement as claimed in claim 1 wherein a number of switching transistors are arranged in the rows and columns of a matrix, while the bases of the transistors of one and the same row are connected to the same row control-conductor and the emitters of transistors of one and the same column are connected to the same column control-conductor, and the collectors of the transistors are connected to the individual identifying points of the various trigger circuits, there being provided means for applying a current or voltage pulse to one column control-conductor and one row control-conductor so that the switching transistor concerned becomes conductive and the trigger circuit connected to the collector thereof gets into the state of high dissipation.

* * * * *